(12) United States Patent
Panchadsaram et al.

(10) Patent No.: US 8,429,542 B2
(45) Date of Patent: Apr. 23, 2013

(54) SWITCHING OF EMAILS IN A CONVERSATION THREAD

(75) Inventors: Ryan Panchadsaram, San Francisco, CA (US); Karan Misra, Mountain View, CA (US); Amy Wang, Saratoga, CA (US); Hui Nee Chin, Sunnyvale, CA (US); Todd Barthelme, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 249 days.

(21) Appl. No.: 12/952,614

(22) Filed: Nov. 23, 2010

(65) Prior Publication Data

US 2012/0131474 A1    May 24, 2012

(51) Int. Cl.
*G06F 13/00*    (2006.01)
*G06F 15/00*    (2006.01)

(52) U.S. Cl.
USPC ............................................ 715/752; 715/835

(58) Field of Classification Search .................. 715/716, 715/705, 708, 840, 239, 751–753, 810, 835, 715/812, 763, 765
See application file for complete search history.

(56) References Cited

U.S. PATENT DOCUMENTS

| | | | |
|---|---|---|---|
| 7,356,772 B2 * | 4/2008 | Brownholtz et al. | 715/752 |
| 7,506,263 B1 * | 3/2009 | Johnston et al. | 715/752 |
| 7,693,940 B2 | 4/2010 | Carmel | |
| 7,716,593 B2 * | 5/2010 | Durazo et al. | 715/752 |
| 7,769,144 B2 * | 8/2010 | Yao et al. | 379/88.13 |
| 2007/0081197 A1 * | 4/2007 | Omoigui | 358/403 |
| 2008/0028031 A1 * | 1/2008 | Bailey et al. | 709/207 |
| 2009/0119678 A1 * | 5/2009 | Shih et al. | 719/313 |
| 2009/0287780 A1 | 11/2009 | Gawor | |
| 2010/0162132 A1 | 6/2010 | Vankamamidi | |

OTHER PUBLICATIONS

Lotus Notes 7 Advanced Messaging and Calendar, wareSource.com, © 2006, 35 pages.
Rohall et al., "Email Visualizations to Aid Communications," published Oct. 22, 2001, 4 pages.
Venolia et al., "Understanding Sequence and Reply Relationships within Email Conversations: A Mixed-Model Visualization," published Dec. 15, 2004, 4 pages.
Yeh et al., "Email Thread Reassembly Using Similarity Matching," published Jul. 27, 2006, 8 pages.

* cited by examiner

*Primary Examiner* — Cao "Kevin" Nguyen
(74) *Attorney, Agent, or Firm* — Merchant & Gould

(57) ABSTRACT

A method is disclosed for rendering messages in an email application on a client computer. A plurality of email messages is received from a server computer, including a first email message, a second email message and a third email message. The first email message is rendered on the client computer with a first conversation icon that identifies the first email message as being part of an email conversation thread. When the first conversation icon is selected on the first email message, a view is rendered showing one or more email messages in the conversation thread. When the second email message is selected, the second email message is rendered on the client computer with a second conversation icon. When the second conversation icon is selected on the second email message, the view showing the one or more email messages in the conversation thread is rendered.

20 Claims, 7 Drawing Sheets

SWITCHING OF EMAILS IN A CONVERSATION THREAD

BACKGROUND

Email messages are typically arranged in an inbox of an email system in the order in which each email message is received by the email system. Some of the email messages are part of conversation threads in which one user originates an email message and one or more users respond to the email message or forward the email message to others.

In order for users of the email system to view the email messages in a conversation thread, some email systems require a search to be performed for the email messages in the conversation thread. Some email systems also require that a user be in a specific mode of the email system in order to initiate the search. In addition, each time a user returns to view messages in the inbox, a new search typically needs to be performed in order to view the email messages in the conversation thread.

SUMMARY

Embodiments of the disclosure are directed to a method for rendering messages in an email application on a client computer. A plurality of email messages is received from a server computer. The plurality of email messages including a first email message, a second email message and a third email message. The first email message is rendered on the client computer. The rendered first email message includes a first conversation icon that identifies the first email message as being part of an email conversation thread. The selection of the first conversation icon on the first email message is allowed. When the first conversation icon is selected on the first email message, a view is rendered showing one or more email messages in the conversation thread. The one or more email messages in the conversation thread include the first email message, the second email message and the third email message. The selection of the second email message is allowed from the view showing the one or more email messages in the conversation thread. When the second email message is selected, the second email message is rendered on the client computer. The second email message is rendered with a second conversation icon. The selection of the second conversation icon on the second email message is allowed. When the second conversation icon is selected on the second email message, the view showing the one or more email messages in the conversation thread is rendered.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

The present application is directed to systems and methods for viewing email messages in an email conversation thread and for switching back and forth between a rendered view of an email message and a rendered view of the conversation thread. In some examples, switching is optimized, typically requiring only one click of a mouse. In addition, the systems and methods operate in a common send/receive mode and do not require a user to be in a separate conversation mode to view email messages in a conversation thread.

In this disclosure, a conversation thread comprises two more related email messages. The two or more email messages are related by having either a common subject or common thread topic. The thread topic is discussed in more detail herein.

Figure 1:
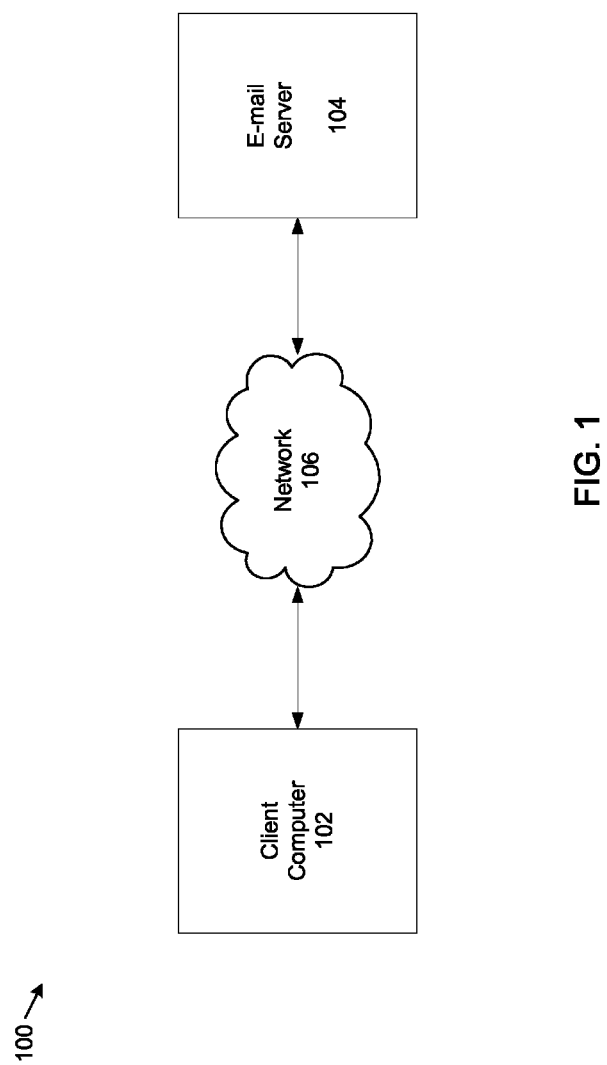
FIG. 1 shows an example system that supports email communication between a client computer and a server computer.

FIG. 1 shows an example system 100 that supports email messaging. The example system 100 includes an example client computer 102 and an example email server 104. The client computer 102 and the email server 104 are connected by an example network 106.

The example client computer 102 runs client-based email application software, for example the Microsoft Outlook® personal information manager from Microsoft Corporation of Redmond, Wash. An example of email server 104 is the Microsoft Exchange Server 2010. Network 106 may be either the Internet or a corporate Intranet. Typically, an email system includes many client computers and email servers. More client and server computers are possible in example system 100.

Figure 2:
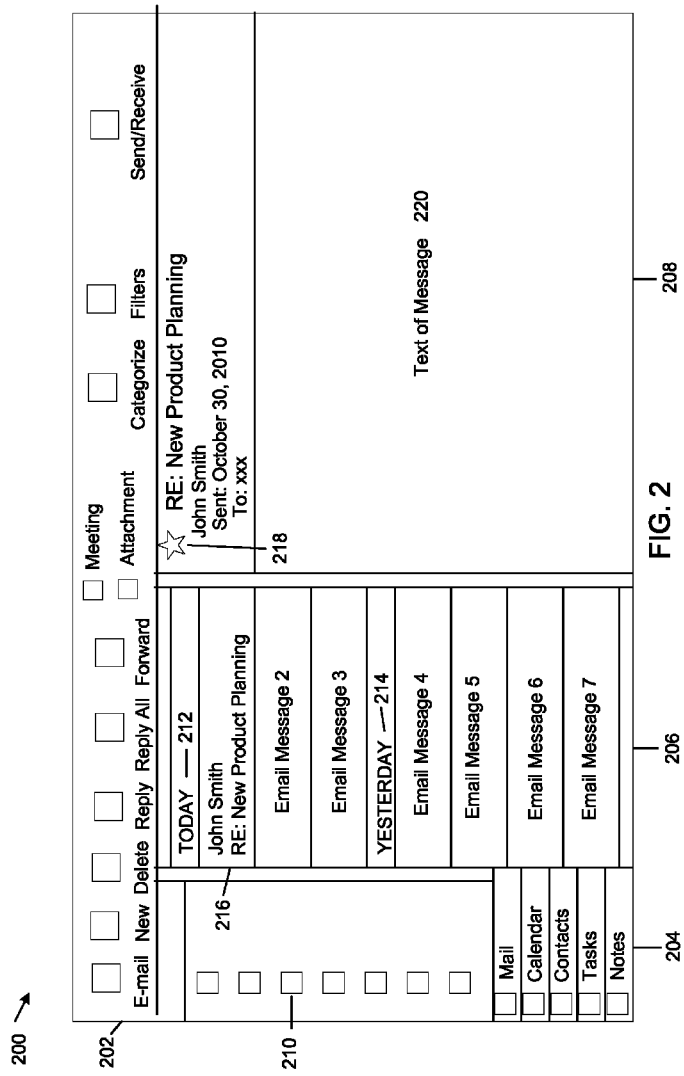
FIG. 2 shows an example view of an email application on the client computer of FIG. 1.

FIG. 2 shows an example user interface 200 of the example email application on client computer 102. The example user interface 200 includes an example toolbar 202 and three example panes 204, 206 and 208. The example toolbar 202 includes icons representing various operations that a user can perform on the email application. For example, a user can create a new email message, delete an email message, reply to an email message, forward an email message, categorize an email message, etc. More example icons and email operations are possible.

The three panes 204, 206 and 208 illustrate an example organization structure for the user interface 200 of the email application. Example pane 204 provides one or more folders 210 in which a user may organize and save email messages. Example pane 206 shows an inbox for the email application. In the example inbox of pane 206, incoming email messages are grouped by when they are received. For example, all email messages that were received the current day are grouped under the example Today label 212 and all email messages that were received the day before are grouped under the example Yesterday label 214. Other labels are possible. In other examples labels are not used, and the email messages are listed in ascending or descending order based on various parameters (send date, receive date, sender, recipient, etc.).

The email messages shown in example pane 206 are ordered by the date and time that the email messages were received. Typically, the most recent email messages are displayed at the top of pane 206 and the least recent displayed email messages are shown at the bottom of pane 206.

Example pane 208 is a preview pane. When an email message is selected in the inbox of example pane 206, the selected email message is rendered in the preview pane. The preview pane 208 also renders a list of email messages in a conversation thread, as discussed in more detail herein.

In the inbox of pane 206, the most recent email message displayed is email message 216. Example email message 216 is from John Smith and is a reply to an email message in a conversation thread having the subject of "New Product Planning." Example text 220 of the contents of example email message 216 is shown in the preview pane. To the left of the subject "RE: New Product Planning" at the top of the preview pane is an example icon 218. The icon 218, in this case shaped as an asterisk, is a conversation icon, indicating that email message 216 is part of a conversation thread. In examples, different icons may be used to represent that an email message is part of a conversation thread.

Figure 3:
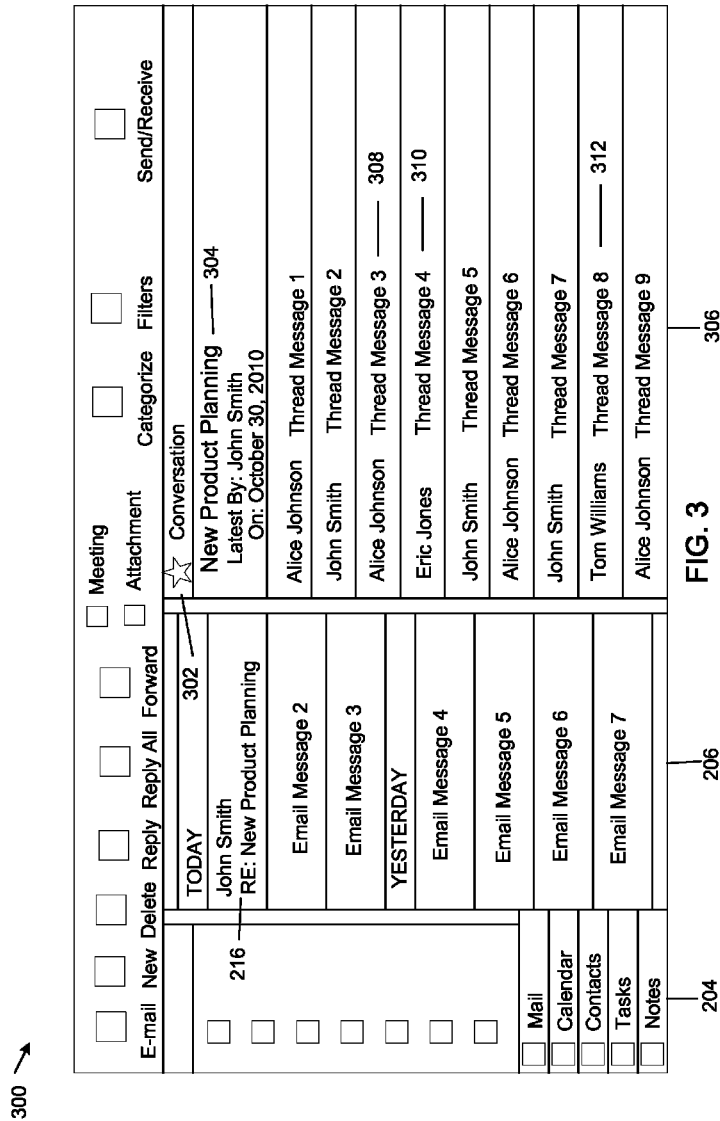
FIG. 3 shows another example view of the email application on the client computer of FIG. 1.
Figure 4:
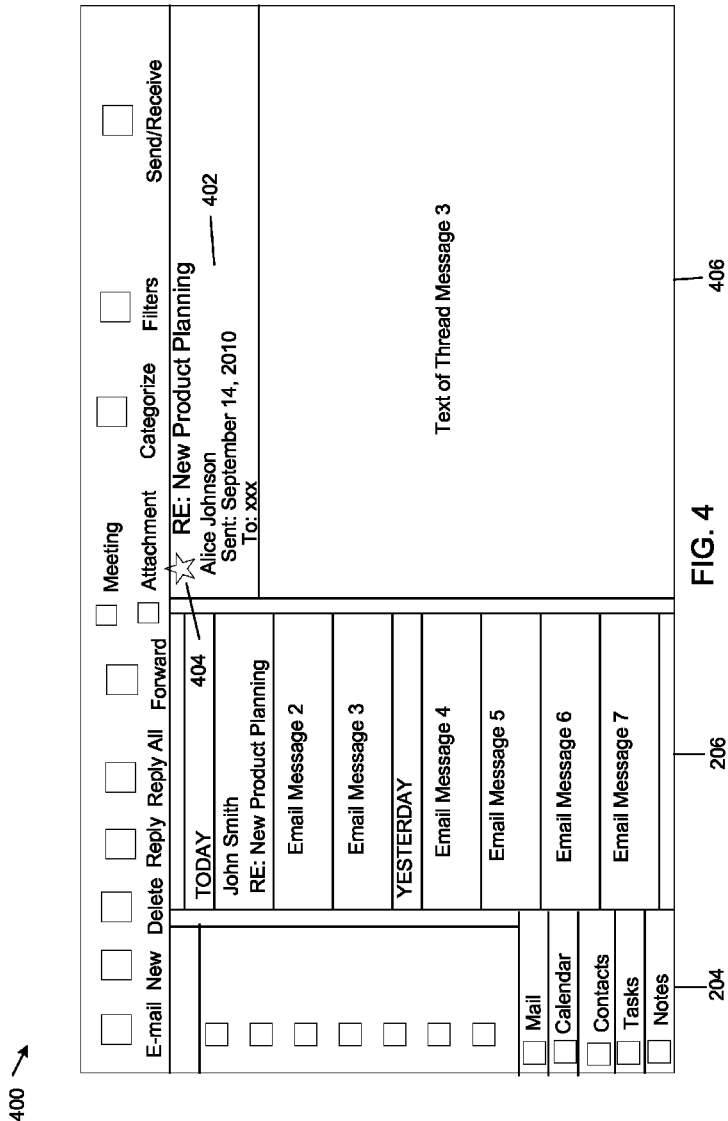
FIG. 4 shows a third example view of the email application on the client computer of FIG. 1.

When a user selects icon 218, for example by positioning a mouse on icon 218 and left clicking, a list of email messages in the conversation thread is displayed. FIG. 3 shows the example user interface 200 when a user selects the example icon 218. As shown, in FIG. 3, when the user selects the example icon 218, the list of email messages in the conversation thread is rendered in preview pane 306. When a list of all the email messages in the conversation thread fit within the size of the preview pane 306, the preview pane 306 shows all the email messages in the conversation thread. When the list of all the email messages in the conversation thread cannot fit within the size of the preview pane 306, a scroll bar (not shown) is used.

An example conversation icon 302 and the word "Conversation" appears at the top of the preview pane 306. The conversation icon 302, in this example an asterisk, is the same type of icon used for each email message in the conversation thread. For example, icon 218 from message 216 and icon 302 are type same type of icon, in this example an asterisk. In examples, other types of icons or conversation indicators may be used.

The email messages in the conversation thread, for example thread message 1 through thread message 9, are typically ordered by date and time received, with the most recent email message in the conversation thread, for example thread message 1 from Alice Johnson, at the top of the email messages listed. A topic of the conversation thread, in this example New Product Planning, is part of a header frame 304 near the top of the preview pane 306. The header frame 304 also indicates that the latest email in the conversation thread is by John Smith on Oct. 30, 2010.

A user can select one of the email messages in the conversation thread and display the contents of the selected email message. Once the user views the selected email message, the user can select a conversation thread icon on the selected email message and quickly switch back to the conversation thread. In this manner, a user can quickly switch back and forth between viewing all email messages in the conversation thread and viewing individual email messages in the conversation thread simply by clicking a mouse and without needing to do a search for the email messages in the conversation thread. For example, a user may select any one of the email messages thread message 1 through thread message 9 in the conversation thread.

When a user selects example thread message 3 from Alice Johnson, the example view 400 is displayed. In the example view 400, the text of thread message 3 is displayed in preview pane 406. In addition a header frame 402 is displayed showing a conversation thread icon 404 and information including the subject of thread message 3 (RE: New Product Planning), the author of thread message 3 (for example, Alice Johnson), when thread message 3 was sent (for example Sep. 14, 2010) and a To: field indicating a list of recipients of the thread message 3.

When the user selects the example conversation thread icon 404, the example view 300 is displayed again, showing the example preview pane 306, listing email messages in the conversation thread. In examples, when the user selects another email message in the conversation thread, for example thread message 4 from Eric Jones, the text of thread message 4 is displayed in a preview pane similar to the preview pane 406. In other examples, the text of thread message 4 may open in a separate window rather than in the preview pane 406. Using the example conversation thread icon 404, with a click of a mouse the user can view one or more email messages in the conversation thread and quickly switch back and forth between the conversation thread and an email message in the conversation thread.

In examples, the email application on client computer 102 may include a plurality of conversation threads. Each email message in a conversation thread includes a conversation icon identifying the email message as belong to a conversation thread. The type of conversation icon used is determined by the email application. Typically the same type of conversation icon is used for each conversation thread in the plurality of conversation threads. The email application distinguishes one conversation from another via the subject or thread topic associated with a conversation thread.

In examples, email messages in a conversation thread may include email messages in one or more folders. When a view of a conversation thread is rendered by selecting a conversation icon of an email message in one folder and an email message that is selected from the conversation thread is from a different folder, the email message from the different folder is rendered in a separate window rather than in a preview pane. When the window is closed, the list of email messages in the conversation thread is rendered again. For example, when thread message 8, email message 312, from Tom Williams is selected, because the email message 312 is located in a different folder than the email messages listed in the example inbox of pane 206, the email message 312 is not rendered in a preview pane. Instead, email message 312 is rendered in a separate window (not shown). When the window is closed, a view of the conversation index, for example preview pane 306, is rendered again.

Figure 5:
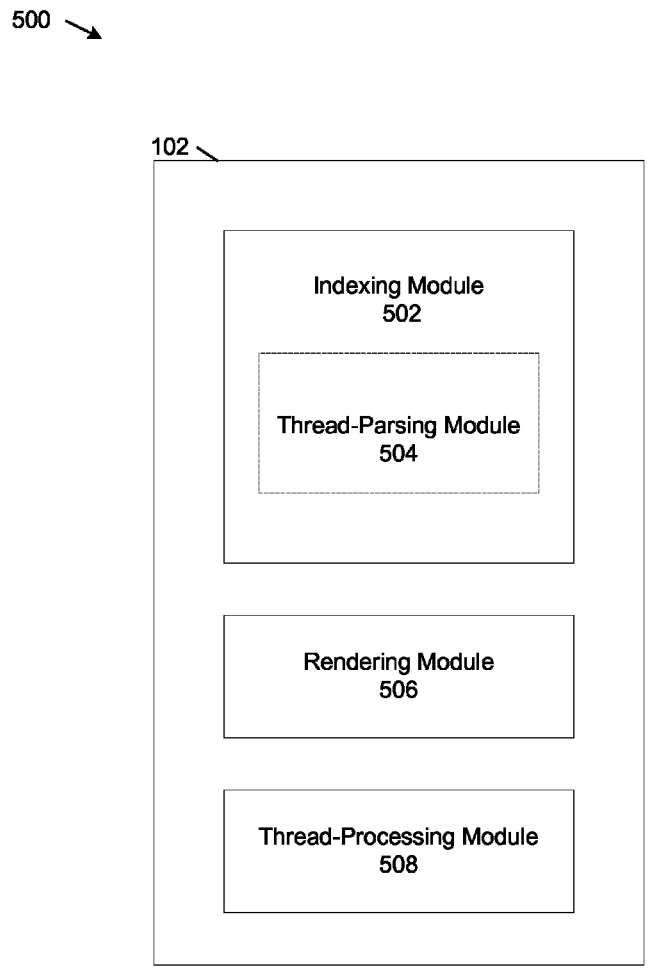
FIG. 5 example functional modules of the email application on the client computer of FIG. 1.

FIG. 5 shows example functional modules 500 of the example email software application on client computer 102. The functional modules include an example indexing module 502, an example thread-parsing module 504, and example rendering module 506 and an example thread-processing module 508.

Whenever an email message is received at client computer 102 from email server 104, the email message is stored in a cache memory on client computer 102. The example indexing module 502 provides an index for each received email message. An index as used in this disclosure is a software pointer to an email message stored in memory on client computer 102. The index facilitates a quick identification and location of the email message.

The example thread-parsing module 504 is part of the example indexing module 502. As each email message is received, the example thread-parsing module 504 parses the email message to determine whether the email message is part of a conversation thread. The example thread-parsing module 504 determines whether the email message is part of a conversation thread by determining whether a subject for email message includes the strings "RE" or "FWD". The subject is a character string typically included in a header of the email message. A string of "RE" in the email message header indicates that the email message is a reply to the received email message. A string of "FWD" in the email message header indicates that the received email message is to be forward to another user.

When the thread-parsing module 504 identifies a string of "RE" or "FWD" in the email message header, the thread-parsing module 504 designates the received email message as part of a conversation thread. In addition, the thread-parsing module 504 identifies the subject of the received email message and associates the conversation thread with the identified subject.

In examples, the thread-parsing module 504 may use one or more alternative methods to determine whether a received email message is part of a conversation thread. For example, the received email message may include metadata indicating that the received email message is part of a conversation thread. For example, the metadata may include a character string representing a thread topic. Email messages have a common thread topic are designated as part of a conversation thread. Other examples are possible.

The example rendering module 506 renders a view of the email application on client computer 102. As shown in FIG. 2, an example view may include a toolbar 202 at the top of the view. The example view may also include panes 204, 206 and 208. As discussed, example pane 204 provides one or more folders 210 in which a user may organize and save email messages and example pane 206 shows an example inbox for the email application. Also, as discussed, pane 208 is a preview pane. In examples, the preview pane may show the text of an email message selected from the example inbox. The preview pane may also list email messages in a conversation thread.

The example thread-processing module 508 processes events associated with selecting a conversation icon in an email message or in a conversation thread list. When a user selects a conversation icon in an email message, for example conversation icon 218 or conversation icon 404, the example thread-processing module 508 instructs the rendering module 506 to render a list of email messages in a conversation thread. The conversation thread corresponds to all messages with the same subject or the same thread topic as the selected email message. The list of email messages is rendered in a preview pane, for example the preview pane 306.

When a user selects an email message in a displayed conversation thread list, for example thread message 3 in the preview pane 306, the example thread-processing module 508 instructs the rendering module to display the text of the email message. For example, the text of thread message 3 is rendered in the example preview pane 406. The thread-processing module 508 also keeps track of all the email messages in a conversation thread and permits fast switching between an email message and the listed emails in the conversation thread.

Figure 6:
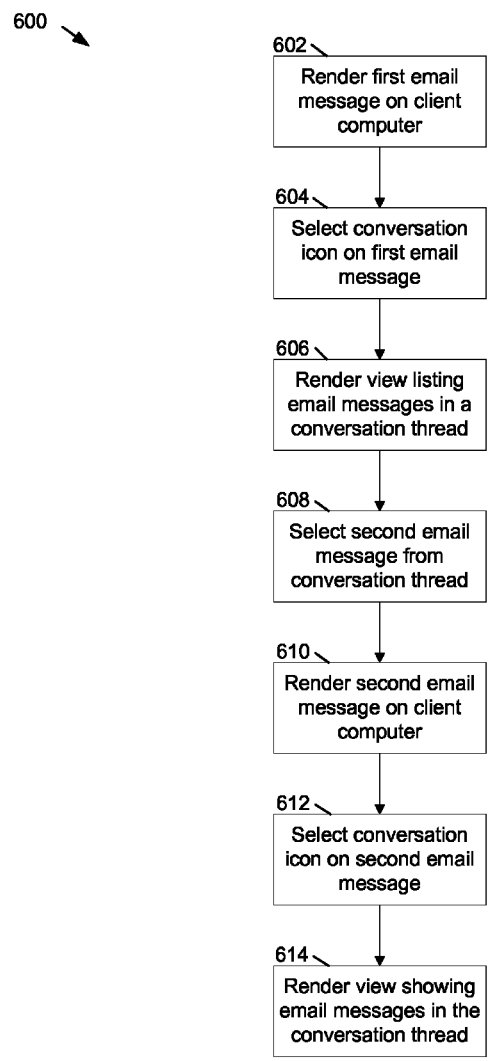
FIG. 6 shows an example flowchart of a method for switching of emails in a conversation thread.

FIG. 6 shows an example flowchart of a method 600 for switching between a rendering of an email message and a conversation thread that includes the email message. At operation 602 a first email message, for example email message 216, is rendered an email application on a client computer. The first email message is typically listed in an inbox of the email application and rendered in a preview pane when a user selects the email message in the inbox.

At operation 604, a conversation icon, for example conversation icon 218, is selected on the selected on the first email message. The conversation icon indicates that the first email message is part of a conversation thread including two or more email messages.

At operation 606, a view is rendered listing email messages in the conversation thread. Preview pane 306 of FIG. 3 shows an example view of a listing of email messages in a conversation thread. Preview pane 306 shows the first email message 216 listed in the preview pane 306 along with other email messages in the conversation thread.

At operation 608, a second email message, for example email message 308, is selected from the conversation thread. As a result of selecting the second email message, at operation 610 the second email message is rendered on the email application on client computer 102. For example, when email message 308 is selected from the conversation thread, email message 308 is rendered in the preview pane 406. The rendering of email message 308 in the preview pane 406 includes the conversation icon 404 at the top of the email message 308. The conversation icon 404 indicates that email message 308 is part of a conversation thread.

At operation 612, a conversation icon is selected on the second email message. For example, conversation icon 404 is selected. As a result of selecting conversation icon 404, at operation 614, a view is rendered on the email application on client computer 102 listing email messages in the conversation thread. For example, the preview pane 306 may be rendered again.

Figure 7:
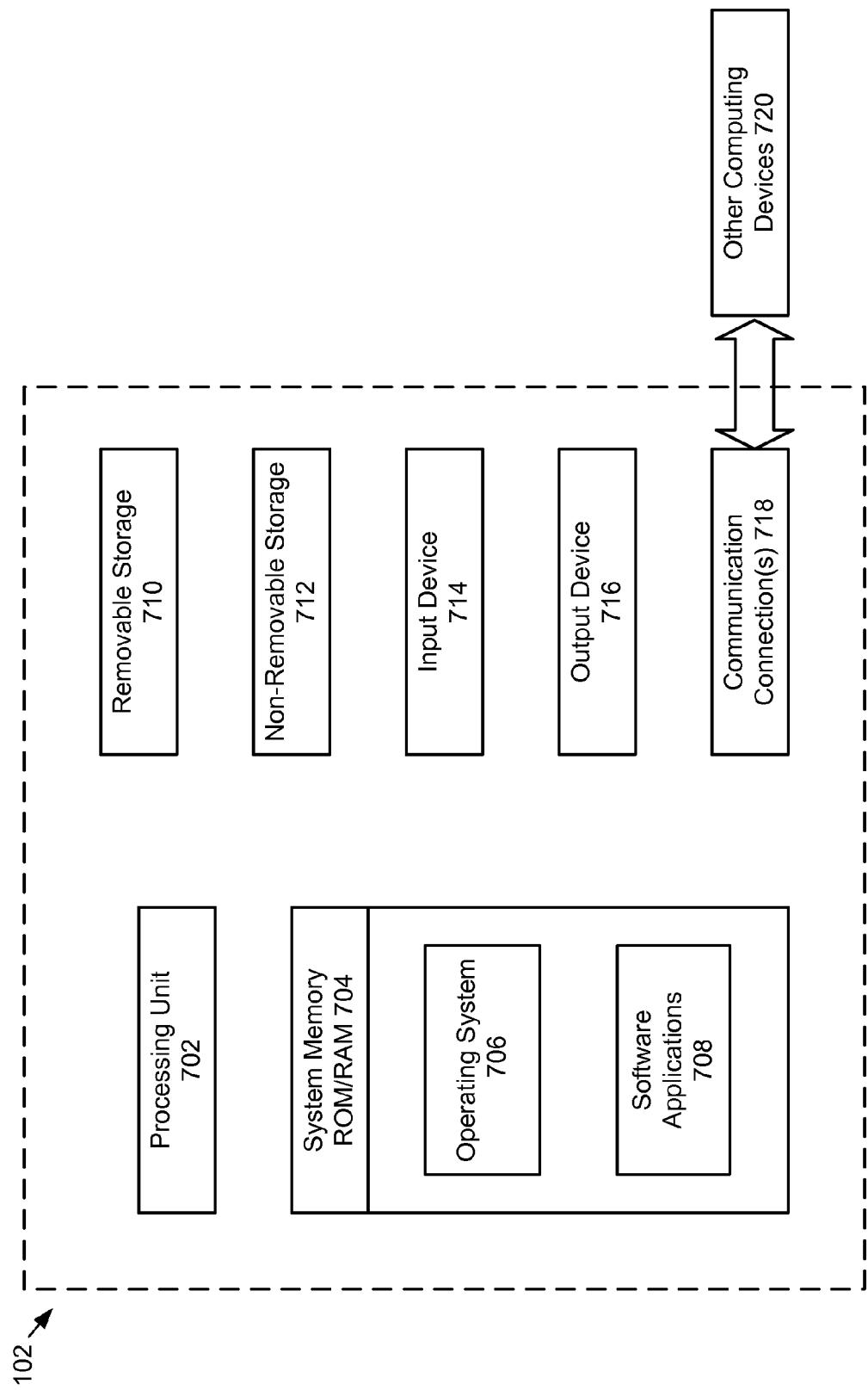
FIG. 7 shows example components of the speech recognition system of FIG. 1.

With reference to FIG. 7, example components of client computer 102 are shown. In example embodiments, the client computer 102 is a computing device. The client computer 102 can include input/output devices, a central processing unit ("CPU"), a data storage device, and a network device.

In a basic configuration, the client computer 102 typically includes at least one processing unit 702 and system memory 704. Depending on the exact configuration and type of computing device, the system memory 704 may be volatile (such as RAM), non-volatile (such as ROM, flash memory, etc.) or some combination of the two. System memory 704 typically includes an operating system 706 suitable for controlling the operation of a networked personal computer, such as the Windows® operating systems from Microsoft Corporation of Redmond, Wash. or a server, such as Microsoft Exchange Server 2007, also from Microsoft Corporation of Redmond, Wash. The system memory 704 may also include one or more software applications 708 and may include program data.

The client computer 102 may have additional features or functionality. For example, the client computer 102 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 7 by removable storage 710 and non-removable storage 712. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the client computer 102. Any such computer readable storage media may be part of the client computer 102. The client computer 102 may also have input device(s) 714 such as keyboard, mouse, pen, voice input device, touch input device, etc. Output device(s) 716 such as a display, speakers, printer, etc. may also be included.

The client computer 102 may also contain communication connections 718 that allow the device to communicate with other computing devices 720, such as over a network in a distributed computing environment, for example, an intranet or the Internet. Communication connection 718 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The various embodiments described above are provided by way of illustration only and should not be construed to limiting. Various modifications and changes that may be made to the embodiments described above without departing from the true spirit and scope of the disclosure.

What is claimed is:

1. A method for rendering messages in an email application on a client computer, the method comprising:
   receiving a plurality of email messages from a server computer, the plurality of email messages including a first email message, a second email message and a third email message;
   rendering the first email message on the client computer, the rendered first email message including a first conversation icon that identifies the first email message as being part of an email conversation thread;
   allowing the selection of the first conversation icon on the first email message by receiving a single action on the first conversation icon;
   when the first conversation icon is selected on the first email message, rendering a view showing one or more email messages in the conversation thread, the one or more email messages in the conversation thread including the first email message, the second email message and the third email message;
   switching, from the rendered view showing the one or more email messages in the conversation thread, to a view in which only the first email message is rendered on the client computer by receiving the single action on the first email message;
   allowing the selection of the second email message from the view showing the one or more email messages in the conversation thread;
   when the second email message is selected, rendering the second email message on the client computer, the second email message being rendered with a second conversation icon;
   allowing the selection of the second conversation icon on the second email message; and
   when the second conversation icon is selected on the second email message, rendering the view showing the one or more email messages in the conversation thread.

2. The method of claim 1, further comprising:
   allowing the selection of the third email message from the view showing the one or more email messages in the conversation thread; and
   rendering the third email message on the client computer, the third email message being rendered with a third conversation icon.

3. The method of claim 2, wherein the first conversation icon, the second conversation icon and the third conversation icon are a same type of conversation icon.

4. The method of claim 2, wherein one or more of the plurality of email messages is indexed by a subject string or by a thread topic.

5. The method of claim 1, wherein one or more email messages in the plurality of email messages are parsed on the client computer, the parsing of the one or more email messages in the plurality of email messages identifying one or more email messages that are part of the conversation thread.

6. The method of claim 4, wherein identifying one or more email messages that are part of the conversation thread further comprises identifying a thread topic that is common among the one or more email messages in the conversation thread.

7. The method of claim 6, wherein the thread topic comprises a character string.

8. The method of claim 5, wherein identifying one or more email messages that are part of the conversation thread further comprises identifying a subject string that is common among the one or more email messages in the conversation thread.

9. The method of claim 8, wherein the subject string includes a string "RE" or a string "FWD".

10. The method of claim 1, wherein rendering the view showing one or more email messages in the conversation thread further comprises rendering the one or more email messages in the conversation thread in a preview pane of the email application.

11. The method of claim 1, wherein the second email message is located in a different folder on the email application than the first email message.

12. The method of claim 11, wherein, when the second email message is selected, the second email message is rendered in a new window.

13. The method of claim 12, wherein, when the new window is closed, rendering the view showing one or more email messages in the conversation thread.

14. A system implemented on a client computer for indexing email messages, the system comprising:
   a processing unit;
   a system memory encoding instructions that, when executed by the processing unit, cause the processing unit to create:
      an indexing module that receives one or more email messages from a server computer and stores an index in the system memory for each of the one or more email messages, each index providing a pointer to an associated email message of the one or more email messages;
      a thread-parsing module that parses the one or more email messages and determines whether one or more of the email messages part of a conversation thread;
      a rendering module, that renders a plurality of the one or more email messages on a display on the client computer; and
      a thread-processing module that determines when an email message in the conversation thread is selected and that toggles, in response to a single action on a conversation icon on the email message, a display of the email message between a view showing text from the email message and a view showing a list of email messages in the conversation thread, wherein the thread-processing module further determines when an email message in the view showing the list of email messages in the conversation thread is selected and that toggles, in response to a single action on the email message, a display of the email message between the view showing the list of email messages in the conversation thread and the view showing the text from the email message.

15. The system of claim 14, further comprising the indexing module providing an index for each email message in a conversation thread.

16. The system of claim 14, wherein the thread-parsing module determines whether one or more of the email messages part of a conversation thread further comprises the thread-parsing module identifying a subject or thread topic that is common to at least two of the email messages received from the server computer.

17. The system of claim 14 wherein, when the thread parsing module determines that an email message is part of a conversation thread, the rendering module renders the email message with a conversation icon, the conversation icon indicating that the email message is part of the conversation thread.

18. The method of claim 14, wherein, when the thread-processing module determines that a conversation icon on one of the one or more email messages is selected by a user, the rendering module renders the list of email messages in the conversation thread.

19. The method of claim 14, wherein, when the thread-processing module determines that an email message in the conversation thread is selected, the rendering module renders the email message.

20. A tangible computer-readable storage medium comprising instructions that, when executed by a computing device, cause the computing device to:

receive a plurality of email messages from a server computer, the plurality of email messages including a first email message, a second email message and a third email message;

index each received email message;

render the first email message in a preview pane of an email application on the client computer, the rendered first email message including a first conversation icon that identifies the first email message as being part of an email conversation thread;

allow the selection of the conversation icon on the first email message by receiving a single action on the first conversation icon;

when the first conversation icon is selected on the first email message, rendering a view showing one or more email messages in the conversation thread, the one or more email messages in the conversation thread including the first email message, the second email message and the third email message, the view showing the one or more email messages in the conversation thread being rendered in the preview pane of the email application;

switch, from the rendered view showing the one or more email messages in the conversation thread, to a view in which only the first email message is rendered on the client computer by receiving the single action on the first email message;

allow the selection of the second email message from the view showing the one or more email messages in the conversation thread;

when the second email message is selected, render the second email message on the client computer, the second email message being rendered with a second conversation icon;

allow the selection of the second conversation icon on the second email message;

when the second conversation icon is selected on the second email message, rendering the view showing the one or more email messages in the conversation thread, the view showing the one or more email messages in the conversation thread being rendered in the preview pane of the email application;

allow the selection of the third email message from the view showing the one or more email messages in the conversation thread; and render the third email message on the client computer, the third email message being rendered with a third conversation icon, wherein the first conversation icon, the second conversation icon and the third conversation icon are the same type of conversation icon.

* * * * *